June 12, 1951     R. J. WHITE     2,556,353

AIRCRAFT CONTROL SYSTEM

Filed Jan. 10, 1947     2 Sheets-Sheet 1

INVENTOR.
ROLAND J. WHITE
BY *Richard W. Treverton*
ATTORNEY

June 12, 1951  R. J. WHITE  2,556,353
AIRCRAFT CONTROL SYSTEM
Filed Jan. 10, 1947  2 Sheets-Sheet 2
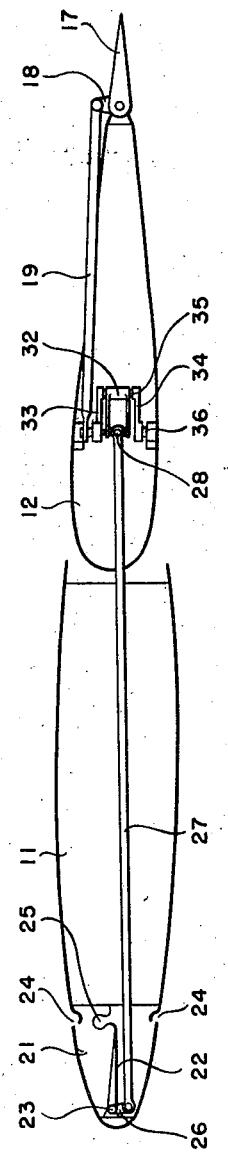
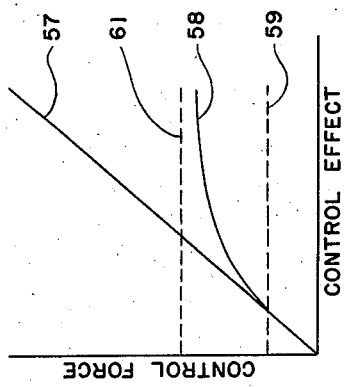
FIG. 4
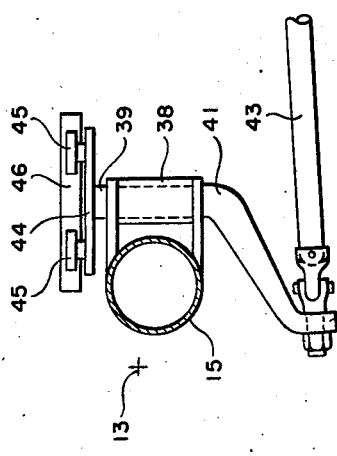
FIG. 3
FIG. 2
INVENTOR.
ROLAND J. WHITE
BY
Richard W. Treverton
ATTORNEY Patented June 12, 1951

2,556,353

UNITED STATES PATENT OFFICE 2,556,353

AIRCRAFT CONTROL SYSTEM

Roland J. White, Seattle, Wash., assignor to Curtiss-Wright Corporation, a corporation of Delaware Application January 10, 1947, Serial No. 721,382

15 Claims. (Cl. 244—82)

This invention relates to an improvement in aircraft controls to provide increased stability and controllability.

It is known that various means may be employed to increase the stability of an airplane. For example it is known that a vane movable in response to changes of angle of attack may be connected to a tab on an elevator in such a manner that when the airspeed is reduced or the angle of attack of the airplane is increased, the tab is caused to pivot upwardly. This will result in a downward movement of the elevator causing the airplane's angle of attack to be reduced and its airspeed increased. Similarly an increase in airspeed or decrease of angle of attack may be corrected automatically by the vane swinging the tab downwardly, resulting in the elevator being moved upwardly.

While the stability of an airplane may be greatly improved by devices of the type above described and by similar devices, such improvement has been accompanied heretofore by a decrease in controllability inasmuch as larger control forces are then required to maneuver the aircraft. Thus while improvement of stability could be readily attained in almost any desired degree, the amount that could be designed into the airplane in practice had been greatly limited because of the necessity of keeping within reasonable limits the magnitude of the pilot control forces in the various necessary flight maneuvers.

The present invention has for a primary objective the provision of control means including means for increasing stability and also of means to remove stability when the airplane is being maneuvered. A stabilizing tab controlled by means responsive to changes in the airplane's angle of attack is provided to increase stability while the pilot is flying hands off the controls, and there are provided means acting automatically upon the application of manual control pressures, to reduce and, if desired, even reverse the action of the stabilizing tab so that only relatively light manual control forces are required during maneuvers. In this way the stability of the airplane may be greatly increased without sacrifice of controllability, or, viewed from another standpoint, manual control forces may be lightened while stability is kept within desired limits.

The foregoing and other objects and advantages will become apparent from the following description of the typical embodiment of the invention shown in the accompanying drawings, wherein:

Figure 2 is a detail view of a differential connection employed in the control system shown in Figure 1 as viewed from the plane indicated at 2—2 in Figure 1;

Figure 3 is a side elevational view of the control means, the airplane control surfaces being shown schematically; and, Figure 4 is a typical control force graph illustrating the improved results attained by use of the invention.

Figure 1:
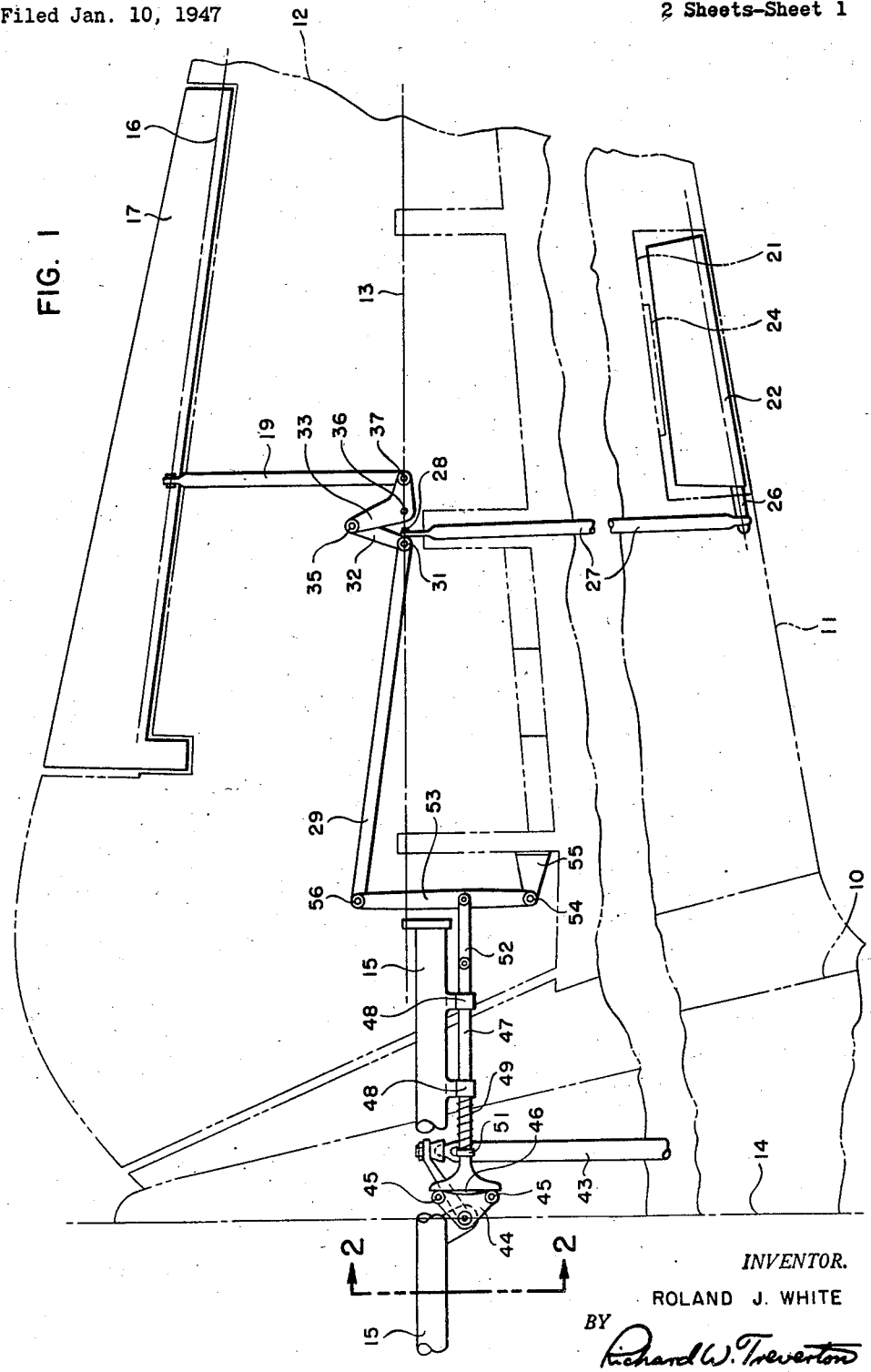
Figure 1 is a plan view of the control system applied to the stabilizer and elevator assembly of an airplane whose structure is shown in broken lines.

As shown in the drawings the aircraft may comprise a fuselage 10, a fixed stabilizer 11, and an elevator 12 hinged along axis 13 to the fixed stabilizer structure. In Figure 1 there is shown only the part of the airplane structure that is disposed to one side of the longitudinal center line 14, and it will be understood that the structure on the opposite side may be of generally similar form. The sections of elevator 12 on opposite sides of the fuselage center line may be connected for movement as a unit by a torque tube 15, which in the illustrated embodiment is offset forwardly of the elevator hinge axis 13.

Hinged along an axis 16 to the trailing edge of the elevator 12 is a relatively small stabilizing airfoil or tab 17 having a horn 18. To the latter pivotally connects a link 19 through which control movements are applied to the tab. Formed within the nose of the stabilizer is a compartment 21 divided into upper and lower chambers by a vane 22 which is pivoted at 23 to the stabilizer structure. The chambers are respectively vented by narrow, elongated openings 24 to the atmosphere above and below the stabilizer. The free edge portions of the vane may be sealed in any suitable manner, such as by a flexible strip 25, so that differential pressures may exist in the upper and lower chambers. A crank arm 26 extends from the vane and is connected to a link 27 by which motion of the vane is transmitted to the tab link 19.

Link 27 is connected by a self-aligning pivot means 28 to the outer end of a link 29. Pivot 28 preferably lies approximately upon axis 13 when the vane 22 is in its neutral position. The outer end of link 29 is also pivoted on an upright axis 31 to a bifurcated member 32. The latter is disposed between upper and lower levers 33 and 34 and is pivoted to them by an upright pin 35. The levers are pivoted at 36 on an upright axis to the elevator 12, and the upper one of them, 33, is connected at 37 to the forward end of tab link 19. Connection 37 provides a pivot above an upright axis which approximately intersects elevator hinge axis 13 when the tab 17 is in its neutral position.

It will be understood that the linkage between the vane 22 and tab 17 will normally function to swing the tab upwardly as the vane swings upwardly, and vice versa; and that the usual movements of the elevator will not appreciably affect the relationship between the tab and vane since the pivots 28, 36 and 37 all lie normally approximately along or intersect the hinge axis 13. It will also be understood that the linkage described constitutes a variable ratio connection between the vane and tab, since by movement of pivot 31 toward or away from pivot 36, the moment arm of the force in link 27 about pivot 36 can be varied, while the length of the arm 36—37 remains unchanged. If the pivot 31 is moved across the axis of pivot 36 to the same side thereof as the pivot 37, the action of the vane upon the tab will be reversed; upward movement of the vane will cause the tab to swing downwardly. The means for shifting link 29 to effect the change of ratio and reversing action will next be described.

The torque tube carries a bearing 38 in which is journalled, on a substantially upright axis, a rocker shaft 39. The latter has a crank arm 41 extending from its lower end, the crank arm having at its outer extremity means 42 providing a universal pivot connection to an elevator actuator or control link 43. This link, or other means connected to it, may extend to the pilot's compartment of the aircraft, where it is connected to suitable control means, such as a control stick or control column, by which the pilot may cause the link 43 to move forwardly or rearwardly for lowering or raising, respectively, the trailing edge of the elevator. As shown in Figures 1 and 2, the universal connection 42 is spaced below the elevator hinge axis 13 and spaced laterally from the axis of rocker shaft 39. Consequently fore and aft movement of the link 43 may cause (1) the rocker shaft to turn in its bearing 38, the elevator remaining stationary, or (2) the elevator to move about its axis 13, the rocker shaft remaining stationary relative to the elevator, or (3) a combination of the preceding two actions.

Affixed to upper end of the shaft 39 is a rocker 44 carrying spaced and symmetrically disposed rollers 45, both of which normally engage an enlarged end face 46 formed on a rod 47. The latter is guided for axial movement in bearings 48 carried by torque tube 15 or other part of the elevator structure. A spring 49 is confined between a shoulder 51 of the rod and one bearing 48, serving to maintain the face 46 in contact with the bearing means 45 and, if desired, to preload the control system in a manner to be described hereinafter. Rod 47 is connected by a pivoted link 52 to a lever 53 which is fulcrumed at 54 upon a bracket 55 that is secured to the elevator structure. The lever is pivoted at 56 to the inner end of link 29 for shifting the latter to operate the variable ratio means heretofore described.

It will be seen that turning of rocker 44 in either direction will cause one or the other of roller bearings 45 to shift the rod 47 in a direction to further compress spring 49. The spring resists movement of the rocker assembly about its rocking axis, the axis of shaft 39, while having no effect upon movement of the rocker and its arm 41 as a unit with the elevator about its hinge axis 13. Accordingly it will be understood that when loads on the elevator do not exceed a predetermined value, determined by the value to which spring 49 is pre-loaded, movement of the elevator actuator 43 will result only in elevator movement, with no relative movement of the linkage 47, 52, 53, 29 whose function is to vary the effective length and direction of extent of lever arm 28—36.

As will be seen from Figures 1 and 3, assuming no pilot control pressure upon elevator actuator 43, the vane 22 and tab 17 will act in a manner tending to increase the longitudinal stability of the airplane. An increase in angle of attack or reduction of airspeed will, by change in direction of airflow over the nose of the stabilizer, cause an increase in the static pressure in the chamber beneath vane 22 and a decrease in the chamber above the vane. The vane will therefore be urged upwardly, acting through the connecting linkage 27, 32, 33, 19 to urge the tab 17 to swing upwardly, i. e. counterclockwise, about its hinge axis, this action being resisted by aerodynamic forces on the tab tending to hold it in approximately neutral position. The aerodynamic forces on the tab when upturned will urge the elevator downwardly, or clockwise, about its hinge axis 13, and the larger forces acting on the elevator will then tend to nose the airplane down and to increase its airspeed. Similarly a decrease in angle of attack will tend to produce a downswinging motion of the vane and tab, raising the elevator and thereby increasing the angle of attack and lowering the airspeed.

Should the pilot move the actuator element 43 to change the angle of attack, movement of the elevator will, of course, be resisted by the stabilizing means whose action has just been described. Should this resistance exceed the value predetermined in the selection of the spring 49 and its initial compression, the differential mechanism will operate to reduce the stabilizing action: The rocker will be moved about its axis, further compressing spring 49 and shifting link 29 to decrease the length of lever arm 28—36. Consequently the force exerted by the vane upon the tab 17 will be decreased and the tab will be displaced to a lesser degree for a given pressure differential acting on the vane. The reduction of stabilizing action will be proportionate to the resistance of the elevator to manual movement, and should this be sufficient to cause the pivot 28 to move into alignment with the axis of pivot 36 the action of the stabiliizng means will be reduced to zero. If so desired, the parts, especially the spring 49, may be so proportioned to allow pivot 28 to pass beyond the pivot axis 36, in which case the vane and tab system will act to aid, rather than resist, the pilot's movement of the elevator. The further the pivot 28 is moved from pivot 36 on the side thereof toward pivot 37 the greater will become the assisting effect of the tab 17 for a given pressure differential on vane 22. While the effect of the vane on the tab may therefore change from a stabilizing to an unstabilizing effect, the control forces exerted through element 43 are not reversed since upon relaxation of control pressure by the pilot the spring 49 will return the variable ratio means to its normal position shown in Figure 1.

In Figure 4 is shown a typical graph of the pilot control force to produce a given control effect or angular acceleration of the aircraft. The forces for an airplane with balanced elevator and the vane-tab stabilizing means, but without means for reducing or reversing the action of the stabilizing means, is shown by line 57 and for a similar airplane with the present invention by line 58. The pilot control force at which the pre-loading of the spring is equalled, and beyond which the spring will be further compressed, is indicated by dotted line 59; and the control force which is determined to be a permissible maximum is indicated by dotted line 61. As shown, the resistance to elevator movement will be the same in both cases up to the point where line 59 is traversed, which is the point at which the rocker 44 begins to move to further compress spring 49. Thereafter the control force required for increasing control effect continues in approximately the same proportion with the aircraft represented by line 56, while it decreases rapidly for the airplane provided with the present arrangement as shown by line 57. The rate at which the required control force decreases will depend upon the spring rate of the spring 49 selected by the designer, while the point at which the decrease commences, represented by the point where line 59 is traversed, may be varied by changing the degree of compression of the spring in the neutral condition of the assembly.

It now will be understood from the foregoing that the invention provides a means whereby response of the airplane to longitudinal control effort by the pilot may be greatly improved without sacrifice of stability in hands-off control flights, or, conversely, the much greater inherent stability may be provided without sacrifice of controllability.

It will be understood further that the particular system shown and described in detail herein represents only one illustrative embodiment of the inventive principles involved, and that these principles may be otherwise embodied in an airplane control system without departing from the spirit of the invention or from the scope of the appended claims.

I claim:

1. In an aircraft having a fixed structure, a control surface hinged to said structure on an axis transverse of the aircraft, a tab movable on the control surface, tab operating means including a lever connected to the tab and a push-pull rod extending longitudinally of the aircraft for operating the lever, the latter being pivoted to the control surface on an axis substantially normal to said transverse axis, a member connected to said push-pull rod at a connection point substantially along said transverse axis, and said member being movably connected to said lever to move said connection point substantially along said transverse axis toward or away from the pivot axis of the lever.

2. In an aircraft having a fixed stabilizer with an elevator hinged to the trailing edge thereof, a tab hinged to the trailing edge of the elevator, and an actuating element movable in a fore and aft direction to operate the elevator, the stabilizer having a compartment with a pivoted vane therein, said vane dividing the compartment into chambers which are vented respectively to the upper and lower surfaces of the stabilizer, a first rod connected to the vane and a second rod connected to the tab for transferring motion from the vane to the tab, a lever pivoted to the elevator and to the second rod on spaced upright axes which substantially intersect the elevator hinge axis, a first member having a connection substantially on said hinge axis to the first rod and mounted on the lever for movement relative to the latter to move said connection toward or away from the pivot of the lever to the elevator, a rocker pivoted on an upright axis to the elevator and having a universal connection to the actuating element at a point spaced vertically and transversely from the elevator pivot axis and the rocker pivot axis, respectively, said rocker having spaced bearings, another member having a face engaged by said bearings for effecting movement of the other member upon movement of the rocker in either direction about its pivot to the elevator, means for transmitting motion from said other member to said first member, and resilient means for resisting movement of the rocker about its pivot to the elevator.

3. In an aircraft control system, a first member mounted for angular movement and a second member mounted for longitudinal movement, an actuating element for said members mounted for movement in a line substantially normal to the axis of said angular movement, a rocker having spaced bearings pivoted to said first member on a second axis which is substantially normal to said first axis and also to said line of movement, a universal connection between said actuating element and said rocker at a point spaced from said first and second axes, said second member having a face engaged by said bearings to effect movement of the second member in one direction upon angular movement of the rocker in either direction, and spring means for maintaining said face in contact with said bearings.

4. In an aircraft control system, a first member mounted for angular movement and a second member mounted for longitudinal movement, an actuating element for said members mounted for movement in a line substantially normal to the axis of said angular movement, a rocker having spaced bearings pivoted to said first member on a second axis which is substantially normal to said first axis and also to said line of movement, a universal connection between said actuating element and said rocker at a point spaced from said first and second axes, said second member having a face engaged by said bearings to effect movement of the second member in one direction upon angular movement of the rocker in either direction.

5. In an aircraft having a fixed stabilizer with an elevator hinged to the trailing edge thereof, a tab hinged to the trailing edge of the elevator, the stabilizer having a compartment formed therein with a vane pivoted therein, said vane dividing the compartment into chambers which are vented respectively to the upper and lower surfaces of the stabilizer, variable ratio motion transmitting means connecting the vane and tab, a pilot operable element having a differential connection with the elevator and said motion transmitting means for effecting control movement of the elevator and, differentially, changing the ratio of said motion transmitting means to vary the effect of said vane upon the tab.

6. In an aircraft having a fixed stabilizer with an elevator hinged to the trailing edge thereof, a tab hinged to the trailing edge of the elevator, the stabilizer having formed therein a compartment with a vane pivoted therein, said vane dividing the compartment into chambers which are vented respectively to the upper and lower surfaces of the stabilizer to urge movement of the vane in response to changes in angle of attack of the aircraft, variable ratio motion transmitting means connecting the vane and tab for urging the latter, in response to vane movement, in a direction such that aerodynamic forces thereon will urge a movement of the elevator to stabilize the aircraft, a pilot operable element having a differential connection with the elevator and the motion transmitting means for effecting control movement of the elevator and, differentially, changing the ratio of the motion transmitting means to reduce the effect of said vane upon the tab for stabilizing the aircraft as resistance to elevator movement is encountered.

7. In an aircraft having an elevator, a tab on said elevator for urging movement thereof by aerodynamic forces acting on the tab, a first means responsive to changes of airflow over a portion of the aircraft as a result of changes in angle of attack, means for connecting the first means to the tab for operating the latter, said connecting means being operable to vary the effect of the first means on the tab from an effect to increase longitudinal stability through a neutral condition to a reverse effect to increase longitudinal instability, actuating means to operate said elevator, and means responsive to resistance of the elevator to movement by the actuating means for operating said connecting means to decrease the stability of the aircraft.

8. In an aircraft having a movable control surface, a movable tab arranged to move the control surface, operating means for the control surface for moving the latter, a member mounted for movement in response to changes in angle of attack of the aircraft, means connecting said member to the tab for moving the latter to normally effect stabilizing movements of the control surface, said connecting means including adjustable means to vary said stabilizing effect of the member and tab, and a linkage connecting said operating means and said adjustable means, said linkage being operable to adjust said adjustable means to reduce said stabilizing effect in response to resistance of the control surface to movement by said operating means therefor.

9. In an aircraft having a movable control surface, a tab mounted on the surface for angular movement thereon, operating means for the control surface for moving the latter, a member movable in response to changes in aerodynamic forces on the aircraft, means for transferring motion from the member to the tab and including adjustable means to vary the effect upon the tab of said changes in aerodynamic forces, and a linkage connecting said operating means and said adjustable means, said linkage being operable to adjust said adjustable means to reduce said effect upon the tab in response to resistance of the control surface to movement by said operating means therefor.

10. In an aircraft having a movable control surface, a tab mounted on the surface for angular movement thereon, operating means for the control surface for moving the latter, a member movable in response to changes in aerodynamic forces on the aircraft, variable ratio means for transferring motion from the member to the tab to vary the effect upon the tab of said changes in aerodynamic forces, and means connecting said operating means and said motion transferring means, said connecting means being operable to change the ratio of said motion transferring means to reduce said effect upon the tab in response to resistance of the control surface to movement by said operating means therefor 11. In an aircraft having an elevator, a tab movably mounted on said elevator, a first means responsive to changes in airflow over a portion of the aircraft as a result of change in angle of attack, means connecting said first means to the tab for operating the latter to cause by its effect upon the elevator an increase in the longitudinal stability of the aircraft, said connecting means being adjustable to reduce the effect of said first means upon the tab, actuating means to operate said elevator, and a second means connecting said actuating means and said connecting means and including means responsive to resistance of the elevator to movement by the actuating means for adjusting said connecting means to reduce said effect of said first means, thereby reducing the longitudinal stability of the aircraft.

12. In an aircraft having a movable elevator control surface; a first means responsive to changes in the angle of attack of the aircraft; means connecting said first means with said control surface for operating the latter to exert a stabilizing action on the aircraft, said connecting means including means for varying the effect of said first means upon the control surface thereby to vary the degree of said stabilizing action; an actuating element for operating said control surface; a differential connection between the actuating element, the control surface and the effect-varying means; and a resilient element operatively connected to said differential mechanism to urge the control surface to move in response to movement of the actuating element but yielding upon increase in the resistance of the control surface to such movement whereby the differential connection acts upon said effect-varying means to reduce the degree of stabilizing action.

13. Apparatus as defined in claim 12, in which the resilient member is preloaded, thereby precluding operation of the effect-varying means until the resistance to control surface movement reaches a predetermined value.

14. In an aircraft having an elevator, a tab on said elevator for urging movement thereof by aerodynamic forces acting on said tab; a first means responsive to changes of airflow over a portion of the aircraft as a result of changes in angle of attack, said first means being arranged to operate said tab in a direction to stabilize the aircraft and including means to vary the degree of such stabilizing action; a second means to operate said elevator; and a differential connection between said first and second means, said differential connection being responsive to resistance of the elevator to movement by said second means for operating said varying means to reduce the degree of stabilizing action.

15. In an aircraft having a movable control surface; a tab hinged to said control surface; a first means movable in response to changes of air flow over a portion of the aircraft surface; a variable-ratio linkage connecting the first means to the tab; actuating means to operate the control surface; a differential linkage between the actuating means, the control surface and the variable-ratio linkage, said differential linkage being operable, upon increase of resistance to the movement of the control surface by the actuating means, to vary the ratio of the variable-ratio linkage.

ROLAND J. WHITE.

REFERENCES CITED

The following references are of record in the file of this patent:

UNITED STATES PATENTS

| Number | Name | Date |
|---|---|---|
| 2,368,059 | White | Jan. 23, 1945 |
| 2,431,529 | Wendt | Nov. 25, 1947 |

FOREIGN PATENTS

| Number | Country | Date |
|---|---|---|
| 25,873 | France | Feb. 20, 1923 |
| (4th addition to No. 539,323) | | |